July 17, 1923.

W. H. KELLY

PROPELLER FOR FLYING MACHINES

Filed April 9, 1917

Inventor
W. H. Kelly.
By
Attorney

July 17, 1923.

W. H. KELLY

PROPELLER FOR FLYING MACHINES

Filed April 9, 1917

Inventor
W. H. Kelly.
By
Attorney

July 17, 1923.
W. H. KELLY
PROPELLER FOR FLYING MACHINES
Filed April 9, 1917
1,461,913
4 Sheets-Sheet 3
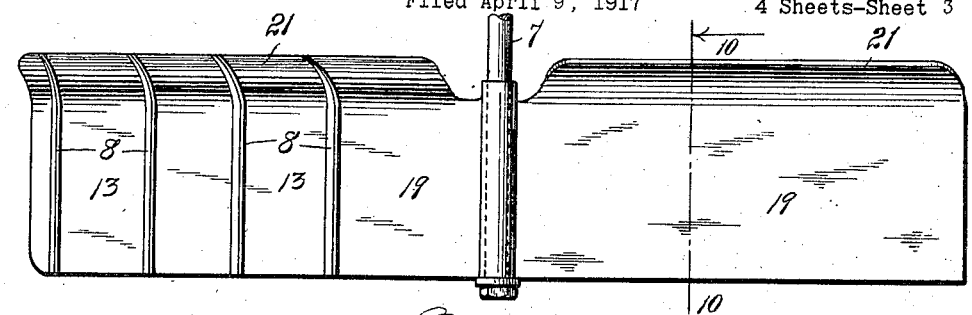
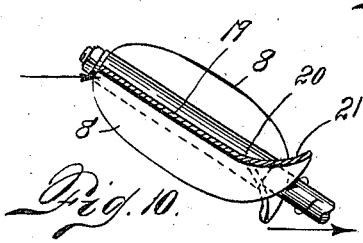
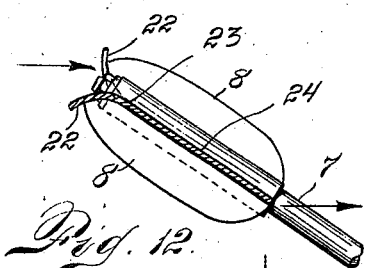
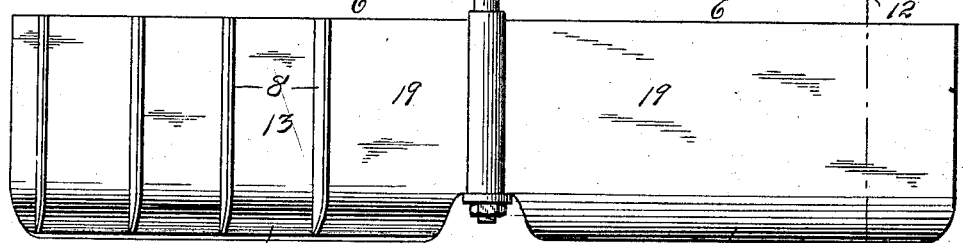
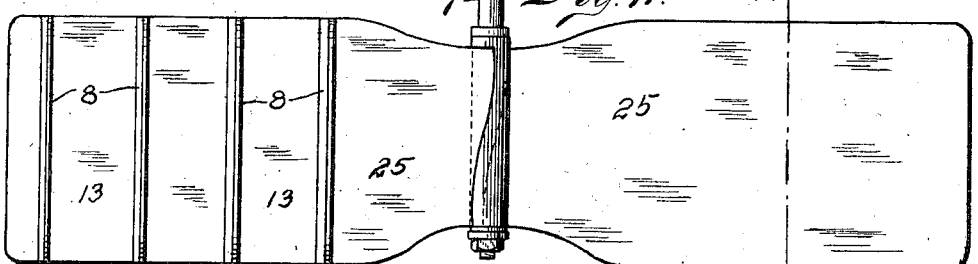
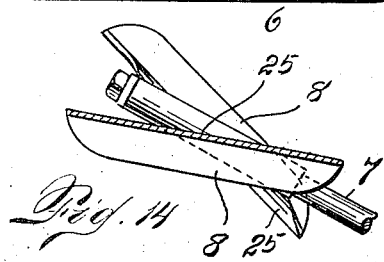
Inventor
W. H. Kelly.
By
Attorney July 17, 1923.
W. H. KELLY
1,461,913
PROPELLER FOR FLYING MACHINES
Filed April 9, 1917
4 Sheets-Sheet 4
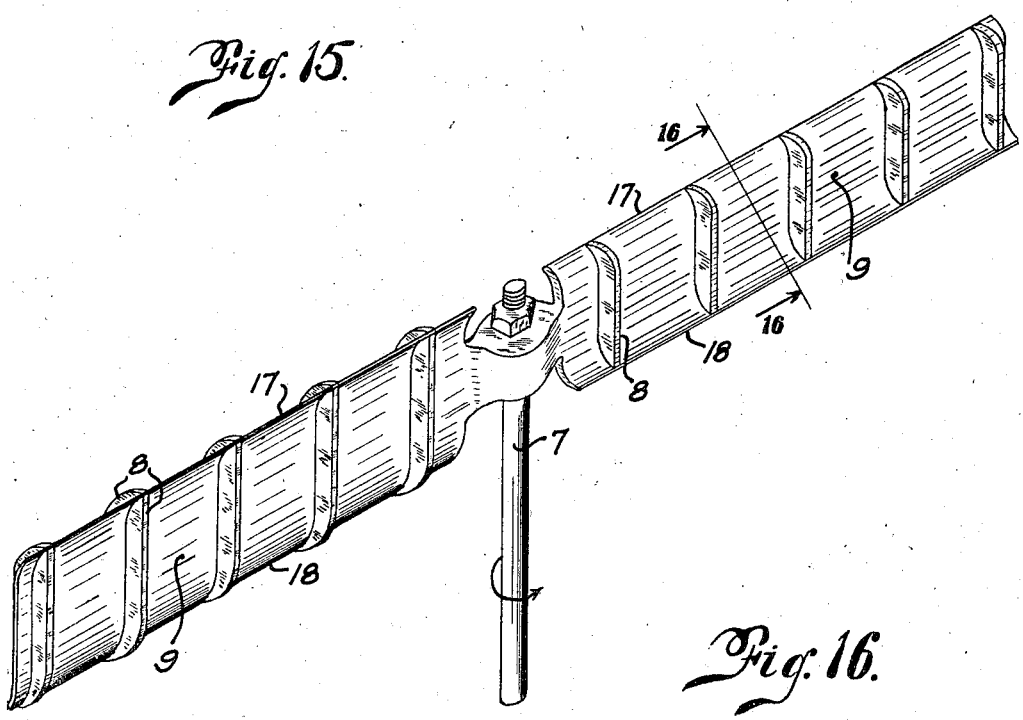
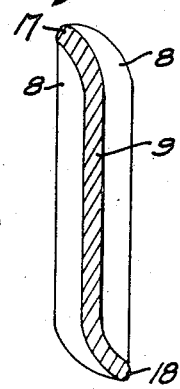
Inventor
W. H. Kelly.
By
Attorney Patented July 17, 1923.

1,461,913

UNITED STATES PATENT OFFICE.

WILLIAM H. KELLY, OF CHEYENNE, WYOMING.

PROPELLER FOR FLYING MACHINES.

Application filed April 9, 1917. Serial No. 160,610.

*To all whom it may concern:*

Be it known that I, WILLIAM H. KELLY, a citizen of the United States, residing at Cheyenne, in the county of Laramie and State of Wyoming, have invented certain new and useful Improvements in Propellers for Flying Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in propellers for flying machines. The object of the invention is to provide a propeller whose blades act both as propellers and at the same time as aeroplane sustaining surfaces just as do the wings of birds and other flying creatures. Another very important object and one which naturally and necessarily results from such construction, is to provide a propeller so constructed that its blades in their forward flight cleave the air edgewise, but which, with reference alone to their movement about their axis, strike the air relatively flatwise or broadside. In order to accomplish these objects, the blades are given such a pitch or are so attached to the shaft or axle upon which they flap or rotate, that a straight line connecting any two points in the front and rear edges of the blades which lie in a plane perpendicular to the longitudinal axis of the blade, will form with a plane passing longitudinally through the axis or shaft and also through either of said points, an angle less than 45 degrees. To make clear why this angle must be less than 45 degrees, I will suppose that the propeller is flying in a perfectly horizontal line with the axis pointed upward and forward at an angle of 45 degrees to the line of flight. Now if the blades, assuming that there are two, when viewed endwise or from the side of the propeller, form angles of 45 degrees with the axis one above and the other below the same as said blades extend transversely from front to rear edge, it will be understood, that one blade will present itself directly or squarely flatwise to the line of flight, that is perpendicular to said line of flight, thus acting as a brake, while the other blade in this position presents itself perfectly edgewise to the direction of flight. Thus it will be seen that in order that the blades may present themselves edgewise to the direction of the flight and thus act as combined aeroplanes and propellers, they must have such a pitch that a straight line connecting any two opposite points in their front and rear edges will form with a plane passing longitudinally through the axis and either of said points, an angle less than 45 degrees. It is preferred to have a large portion of the blades as they extend transversely from front to rear edge, lie largely in or near a plane passing longitudinally through the axis and any given point in the front or rear edges of the blades. The blades as they extend transversely from front to rear may be either straight, singly curved or doubly curved. The blades thus disposed so that they will attack the air flatwise, with reference alone to their movement about their axis, will travel a great distance in their forward flight in each revolution, so that like nature's wings their movement with relation to and about their axis is much slower than the speed of forward flight. In other words, the distance the wings or blades will travel in a given period of time, say in one second, with reference alone to the movement about their axis, will be much less than the distance traveled in forward flight during such period of time.

Having briefly outlined my improvement as well as the function in a general way which it is designed to subserve, I will proceed to describe the same in detail, reference being made to the accompanying drawing. In this drawing:—

Figure 3:
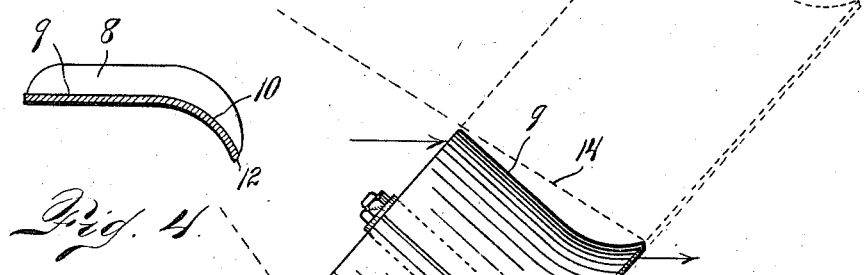

Fig. 3 is a view of the same construction, but showing the propeller tilted so that its axis points upwardly at an angle of say 45 degrees to the horizontal. This may be considered a view so far as the full lines are concerned, looking in the direction of arrow 3, Fig. 1. In dotted lines the position of the blades is shown when at right angles to their full line position.

Figure 1:
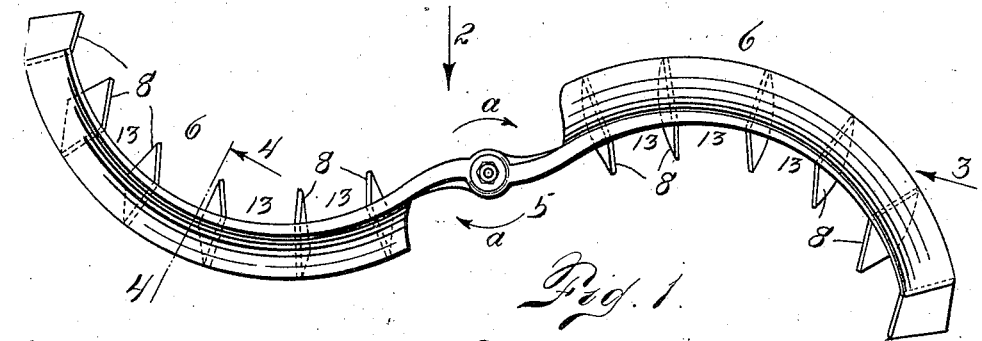
Fig. 1 is a view of one form of my improved propeller viewed in the direction of its axis from a point in front of the same. This is also a view looking in the direction of arrow 1 Fig. 2.
Figure 2:
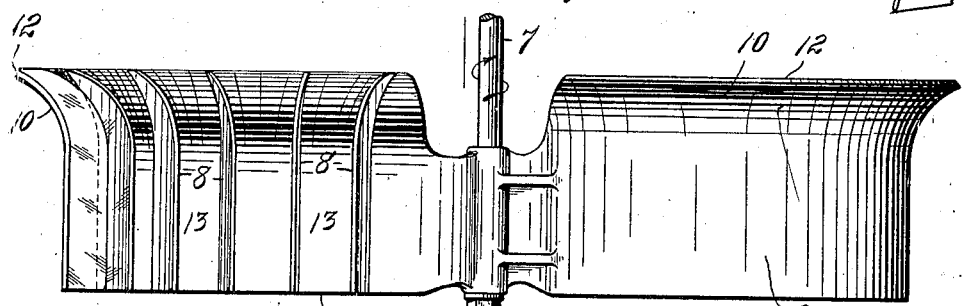
Fig. 2 is a view looking in the direction of arrow 2 Fig. 1.
Figure 4:

Fig. 4 is a section taken on the line 4—4 Fig. 1 looking toward the left.

Figure 5:
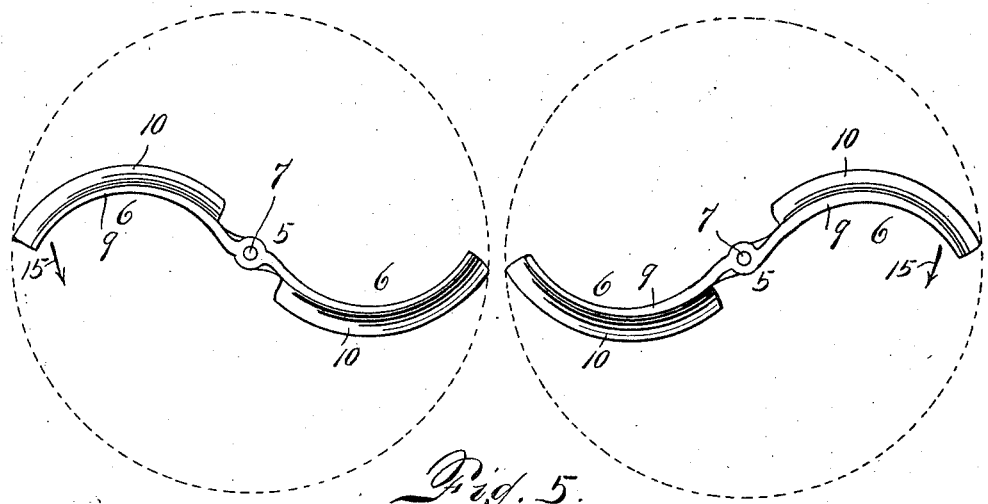

Fig. 5 is a view similar to Fig. 1, but showing two of the propellers arranged to work in unison and rotating in opposite directions for stabilizing purposes, assuming that they are both mounted and properly arranged on the same machine. In these views the auxiliary blades of the previous views whereby air channels from front to rear are formed, are omitted.

Figure 6:
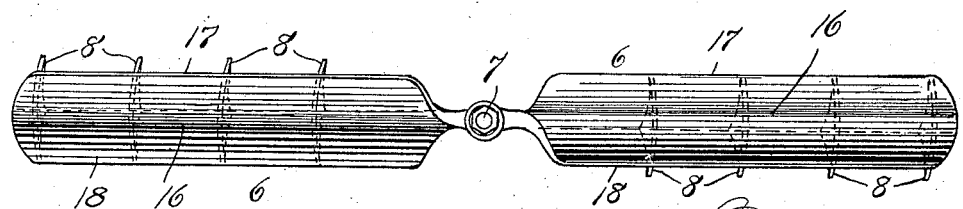

Fig. 6 is a view illustrating a slightly modified form of construction, being a view looking in the direction of the axis of a propeller.

Figure 7:
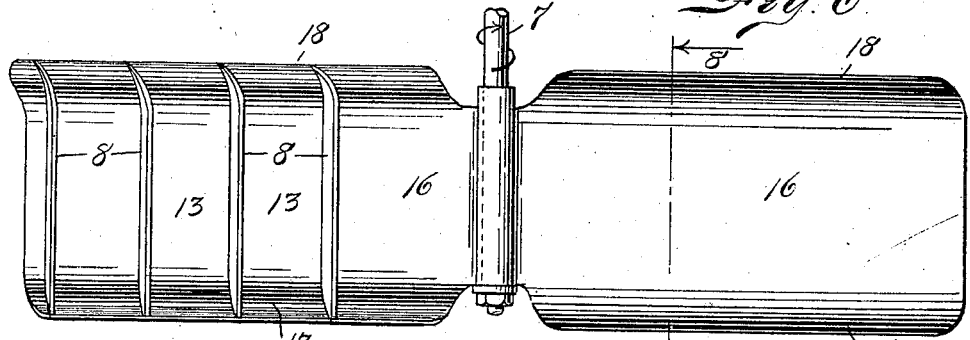

Fig. 7 is a flatwise view of the propeller or a view looking at right angles to the axis.

Figure 8:
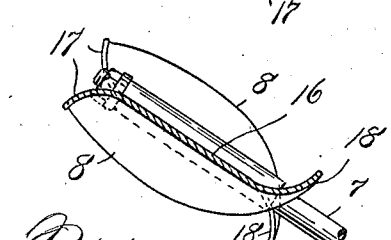

Fig. 8 is a section taken on the line 8—8 Fig. 7 looking toward the left.

Fig. 9 is a view similar to Fig. 7, but showing a slightly modified form of construction.

Fig. 10 is a cross section of one of the propeller blades taken on the line 10—10 Fig. 9 looking toward the left.

Fig. 11 is a view similar to Fig. 9, but showing still another form or embodiment of my invention.

Fig. 12 is a section taken on the line 12—12 Fig. 11 looking toward the left and changing the position of the axis so that it shall point upwardly at an angle of about 45 degrees.

Fig. 13 is a view similar to Figs. 9 and 11 and showing still another form of construction.

Fig. 14 is a section taken on the line 14—14 Fig. 13.

Fig. 15 is a perspective showing a form whose blades are longitudinally straight, but are provided with channels on both sides and have both the front and rear edges curved.

Fig. 16 is a section on line 16—16 of Fig. 15.

In all of these views the shaft to which the propeller blades are secured, extends from the propeller rearwardly or in a direction opposite the direction of flight. This explanation will aid in understanding the views where the shaft is variously disposed as occurs on all of the sheets of the drawing.

The same reference characters indicate the same parts in all the views.

Referring first to Figs. 1 to 4 inclusive, let the numeral 5 designate a propeller considered in its entirety and equipped with two blades 6 which extend outwardly in opposite directions from the shaft 7. These blades are longitudinally curved or concavo-convex, the curve being such that the concave surfaces are always faced in the direction of rotation. In Fig. 1 the direction of rotation is indicated by the arrows a. Hence in this view, the righthand wing or blade has its under-surface concave and its uppper surface convex, while the lefthand blade or wing has its upper surface concave and its lower surface convex. This longitudinal curvature of the wings or blades serves to prevent the outward or lateral travel of the air in a direction longitudinally of the wings or blades and laterally of the direction of flight. It is extremely important to guard against this lateral escape of the air, since the whole object of a propeller is to give movement in the direction of flight, and since the reaction due to the escape of the air from the blades is in the direction of flight, the air should be made to escape in a direction rearward of the direction of flight, and the degree of efficiency of the propeller will depend upon the extent to which that result is attained. Hence in the form of construction shown in the views now under consideration, in addition to the longitudinal curvature of the blades, each blade is equipped with a number of transversely arranged auxiliary blades 8 which are spaced to form air channels arranged transversely of the blades, thus serving to direct the air rearwardly from the blade in order to attain the aforesaid result in the maximum degree. It will be understood that by the formation of these transverse channels, the air which strikes the blades will be directed rearwardly in a direction parallel or approximately parallel with the direction of flight. This is the ideal condition sought to be attained by the peculiar longitudinal curvature of the main blades, this construction being supplemented by the auxiliary blades. Furthermore, these blades have a relatively extensive surface 9 extending parallel or approximately parallel with the axis of the shaft. These portions 9 of the blades, constitute aeroplanes or sustaining elements, while these together with the curved portions 10 of the blades, are acted upon by the air for propulsion purposes thus combining the two functions, viz., the aeroplane or sustaining function and the propeller proper or driving function. It will be noted that the free edges 12 of the curved or inclined portions 10 of the wings or blades extend upwardly on the downwardly moving side and downwardly on the upwardly moving side. The channels between the auxiliary blades 8 are designated by the numeral 13. In order to obtain the best results from a propeller of this construction, its position should be such that its axis is pointed upwardly at an angle of about 45 degrees to the direction of flight, being the position illustrated in Fig. 3 of the drawing, the arrow b in this case indicating the direction of rotation. It will be noted that a straight line connecting any two points in the front and rear edges of either blade, which lie in a plane perpendicular to the longitudinal axis of the blade, will form with a plane passing through the axis of rotation and one of said points an angle of less than 45 degrees. These lines in Fig. 3 are designated by the numeral 14.

Referring now to Fig. 5 it will be noted that the two propellers each of which I will designate by the numeral 5, have longitudinally curved wings 6, but that they are rights and lefts so to speak, that is, the propeller on the right has its blades arranged precisely as the propeller in Fig. 1, while the propeller on the left in Fig. 5 has its blades arranged the reverse of the arrangement in Fig. 1 so far as longitudinal curvature is concerned. It will be noted, however, that where the two propellers are arranged together on the same machine, that they rotate in reverse directions as indicated by the arrows 15. The blades of the propellers in Fig. 5 have the curved surfaces 10 and the relatively large areas 9 which extend parallel or approximately parallel with the axis thus enabling the propellers to perform the aeroplane or sustaining function as well as the propeller function proper.

In the form of construction shown in Figs. 6, 7 and 8, the blades 6 have relatively large areas 16 which extend parallel with the axis of the shaft, while their front edges are curved in the direction of rotation and their rear edges are curved away from the direction of rotation as shown at 17 and 18. The air acting upon the curved forward surfaces 17 of these blades, will have a lifting effect, while the air acting upon the curved surfaces 18 in the rear will have a propelling effect or result in applying a driving force in the direction of flight. In the construction shown in Figs. 6, 7 and 8, the blades are not longitudinally curved, but they are transversely curved at the front and rear edges and have a relatively large intervening transverse surface which is parallel with the axis of the propeller. In the form of construction shown in Figs. 9 and 10, the area 19 of the blade extends parallel with the axis from the front to a point 20 near the rear from which it is curved rather abruptly away from the direction of rotation as shown at 21. Again, in the construction shown in Fig. 11 the forward edge of the blade is curved toward the direction of rotation as shown at 22 from a point 23, from which point rearwardly in a transverse direction the area 24 of the blade lies parallel with the axis. Again, in the construction shown in Fig. 13 the two blades 6 have their surfaces 25 each lying in a single plane from front to rear, the two wings or blades, however, each having a straight line connecting any two points in its front and rear edges which lie in a plane perpendicular to the longitudinal axis of the blade so disposed that it will form an angle of less than 45° with a plane passing through the axis of rotation and one of said points. Furthermore, the planes of the surfaces of these blades are so arranged that they cross each other intermediate the portion of the shaft on which the propeller is mounted.

Attention is called to the fact that in all of the forms of construction except those shown in Fig. 5, the main blades have auxiliary blades 8 extending transversely thereacross forming channels for the air whereby the latter is directed rearwardly and prevented from slipping from the blades laterally or in a direction transverse to the direction of flight.

The propellers shown in Figs. 10 to 13 inclusive may be longitudinally curved if desired.

Thus it will be seen that the flatwise stroke of the blades as they rotate on their axis, results in a number of very great and important advantages. With a comparatively slow rotary movement great forward speed is obtained; and since no matter how great this forward speed may be, the surfaces of the blades lying forward with reference to their rotary movement, will always meet with and accumulate pressure and the blades will continue to exert a forwardly propelling thrust, so that almost unlimited speed may be obtained. The enormous pressure upon the surfaces of the blades, obtained by the comparatively slow and flatwise strokes as the blades rotate on their axis, is brought under absolute control and utilized for propulsion. Now in obtaining this perfect control of the great pressure upon the blade surfaces, it is absolutely necessary to prevent the air from being fanned outwardly by the flatwise stroke in a direction away from the axis. Since the reaction which results in propulsion will necessarily be in a direction opposite to that in which the air and pressure escape or is forced off the surfaces of the blades, the air and pressure must be compelled to travel across the surfaces of the blades transversely and cannot be permitted to follow the powerful tendency to be fanned outwardly and longitudinally of the blades. This can be accomplished only by making the blades longitudinally concavo-convex, (see Figs. 1 to 5 inclusive) the longitudinally concave surfaces being made to travel foremost with reference to the rotary movement; or this same result may be obtained by providing a series of channels 13 (see Figs. 1 to 4 and 6 to 13 inclusive) on the forwardly rotating surfaces, these channels being made to extend transversely from the front to the rear edges of the blades. The longitudinally concave surface, if of the necessary degree or the transversely extending channels, will prevent the air from traveling longitudinally of the wing or blade, and will compel the air and pressure to travel transversely of the blades, in spite of the great tendency of the flatwise striking blades to fan the air and cause the pressure to escape outwardly away from the axis. Of the different shapes of transverse cross sections of the blades, it is preferred to have the rear portions of the blades convex on their forwardly rotating surfaces as the blades extend from front to rear edge, so that the rear portion of the blade will exert a sort of sweeping action on the air much like that of a broom or a fish's tail in action. The forward portion of the blade as it extends between front and rear edges, may be either approximately straight or may be curved in the opposite direction or manner to that in which the rear portion of the blade as it extends transversely is curved, as heretofore described and as illustrated in the drawing. In other words, the surface of the blade lying forward with reference to its movement about the axis, may have its portion nearest the rear edge convex as it extends transversely of the blade, while its portion nearest the front edge is slightly concave as it extends transversely of the blade, so that in transverse cross section the blade forms a double or S-curve. Though the blades having transverse channels may be longitudinally straight, it is preferred to have them longitudinally concave-convex, the channelled surfaces being the longitudinally concave surfaces.

My improved construction may be employed as a marine propeller, but in this case the blades must be flat both longitudinally and transversely as shown in Fig. 14, or doubly curved transversely and lingitudinally straight. Furthermore for this use they must be channeled on both surfaces. Such a form is shown in Figs. 15 and 16.

When this propeller is at rest the blades are in position to attack the air flatwise when rotated. This creates the erroneous impression that the blades when they rotate do attack the air flatwise. This is not true, because the instant the blades begin to rotate they create a current of air which flows rearwardly apast the blades, thus causing the blades to enter into the air, not flatwise, but edgewise, the degree of edgewise attack becoming greater as the speed of the rearwardly flowing air increases. This is best illustrated in the case of the flapping wings of a bird, there being no difference, so far as illustrating the angular attack, between the flapping and rotating wings or blades. On the downward flap the wing would travel forwardly and downwardly thus attacking the air at an angle. On the upward flap the wing would travel forwardly and upwardly, again attacking the air at an angle. Where the forward flight greatly exceeds the flapping movement, the attack would be more edgewise than where the forward flight and flapping action were more nearly equal. Where they were just equal, the wing would attack the air at approximately forty-five degrees. This angular attack of the flapping or rotating wing or blade upon the air causes the pressure upon the active surface to escape readily and forcibly off the rear edge, the reaction resulting in a strong thrust of the wing forward in the direction of flight. The slight flexure of the flexible wing of a bird, both during the upward and downward flap, or the permanent flexure of a rigid, artificial, rotating wing or blade causes the air, even if attacked flatwise to escape off the rear edge, so that the rearward flow of air starts with the first flap or rotation. So far as this angular attack is concerned it does not matter whether the flying machine is standing still and the air being forced rearwardly past the blades of the propeller, or whether the machine is in flight and the blades are entering into and attacking new and undisturbed air, the relation between the blades and the surrounding air being the same in both cases.

Having thus described my invention, what I claim is:

1. A propeller including blades arranged so that a straight line connecting any two points in the front and rear edges of either blade and lying in a plane perpendicular to the longitudinal axis of the blade, shall form with a plane passing longitudinally through the axis of rotation and also through either of said points, an angle less than 45 degrees, the said blades having areas extending transversely thereof between front and rear in which lines from front to rear lie in planes parallel with the axis of rotation, the rear portion of the blade on the forwardly moving side considered with reference to its rotary movement being transversely convex, and its forward edge transversely concave.

2. A propeller including blades arranged so that a straight line connecting any two points in the front and rear edges of either blade and lying in a plane perpendicular to the longitudinal axis of the blade, shall form with a plane passing longitudinally through the axis of rotation and also through either of said points, an angle less than 45 degrees, the said blades having areas extending transversely thereof between front and rear in which lines from front to rear lie in planes parallel with the axis of rotation, the rear portion of each blade adjacent its rear edge being transversely concavo-convex, the convex surface being on the forwardly moving side during rotary action, while the forward portion of either blade adjacent its forward edge is transversely concavo-convex, but with the concave surface foremost considered with reference to the rotary movement of the blade.

3. A propeller including blades connected together at their inner extremities and arranged so that a straight line connecting any two points in the front and rear edges of either blade and lying in a plane perpendicular to the longitudinal axis of the blade, shall form with a plane passing longitudinally through the axis of rotation and also through either of said points, an angle less than 45 degrees, the said blades having areas extending transversely between their front and rear edges, whose lines from front to rear lie in planes parallel with the axis of rotation, the forward portion of either blade immediately adjacent its forward edge being transversely concavo-convex, the concave surface being foremost considered with reference to rotary movement.

4. A propeller including blades connected together at their inner extremities and arranged so that a straight line connecting any two points in the front and rear edges of either blade and lying in a plane perpendicular to the longitudinal axis of the blade, shall form with a plane passing longitudinally through the axis of rotation and also through either of said points, an angle less than 45 degrees, the said blades having relatively large areas extending transversely thereof between front and rear in which lines from front to rear lie in planes substantially parallel with the axis of rotation, the rear portion of either blade being turned away from the direction of rotation to form a propelling surface.

5. A propeller, including blades having intermediate portions parallel with the axis of rotation and having their forward edges concave transversely of the blades.

6. A propeller, including blades having intermediate portions parallel with the axis of rotation and having their forward edges concave transversely and transverse channels on the faces of said blades.

7. A propeller having a shaft set at an angle to the direction of flight and having thereon blades such that, of any two points in a blade, one point being in the front and the other in the rear edge and both points lying in a plane perpendicular to the longitudinal axis of the blade, the point in the front edge will be only slightly in advance of the point in the rear edge with reference to the rotary motion of the blade on its axis.

8. A propeller having a shaft set at an angle to the direction of flight and having thereon blades so arranged that a straight line connecting any two points in the front and rear edges located in a plane cutting the longitudinal axis of the blade at right angles, will form with a plane passing longitudinally through the axis of rotation and also through either of said points at angles less than 45 degrees, the said point in the front edge being only slightly forward of said point in the rear edge with reference to the direction of rotary movement of the blade, each blade adjacent its front edge being transversely concavo-convex with the transversely concave surface forward with reference to the direction of rotary movement of the blade on its axis.

9. A propeller having a shaft set at an angle to the direction of flight and having thereon blades so arranged that a straight line connecting any two points in the front and rear edges located in a plane cutting the longitudinal axis of the blade at right angles, will form with a plane passing longitudinally through the axis of rotation and also through either of said points an angle less than 45 degrees, the said point in the front edge being only slightly forward of said point in the rear edge with reference to the direction of rotary movement of the blade, each blade adjacent its front edge being transversely concavo-convex with the transversely concave surface forward with reference to the direction of rotary movement of the blade on its axis, the surface of each blade lying forward with reference to said rotary movement being provided with channels which extend from the front edge to the rear edge of each blade, and as nearly as possible parallel to the axis of rotation.

10. A propeller, having a shaft set at an angle to the direction of flight and having thereon blades so arranged that of any two given points in the front and rear edges located in a plane cutting the longitudinal axis of the blade at right angles the point in the front edge will be only slightly in advance of the point in the rear edge with reference to the rotary movement of the blade on its axis, each blade adjacent its front edge and on the surface lying forward with reference to said rotary movement being transversely concave and also concave along the lines of intersection of the blade with planes passing perpendicularly through the axis of rotation.

11. A propeller having a shaft set at an angle to the direction of flight, and having blades which are greater in length than in breadth from front to rear edge, the pitch of each blade being such that the surface of each blade lying forward with reference to its rotary movement on its axis will, on the downward stroke of the blade, be at an angle of incidence to the direction of flight.

12. A propeller having a shaft set at an angle to the direction of flight, and having blades which are greater in length than in breadth from front to rear edge, the pitch of each blade being such that a straight line connecting any two given points, one in the front edge and the other in the rear edge of each blade, and both points located in a plane perpendicular to the longitudinal axis of each blade, will form with a plane passing longitudinally through the axis of rotation and either of said points an angle much less than forty-five degrees.

13. A propeller having a shaft set at an angle to the direction of flight, and having blades which are greater in length toward the tip than in breadth from front to rear edge, the pitch of each blade being such that as the blade extends outwardly and horizontally from the axis of rotation the under surface of each blade is at an angle of incidence to the direction of flight.

14. A propeller having a shaft set at such an angle as to point upwardly and forwardly with reference to the direction of flight, and having blades which are greater in length toward the tip than in breadth from front to rear edge, the pitch of each blade being such that as the blade extends outwardly and horizontally from the axis of rotation the under surface of each blade is at an angle of incidence to the direction of flight.

In testimony whereof I affix my signature, in presence of two witnesses.

WILLIAM H. KELLY.

Witnesses:
MARY HIGGINS,
ALBERT O'BRIEN.